United States Patent
Yelamanchili et al.

(10) Patent No.: US 10,565,186 B2
(45) Date of Patent: Feb. 18, 2020

(54) METHODS AND SYSTEMS FOR QUERY RESOLUTION THROUGH GRAPHICAL USER INTERFACES

(71) Applicant: CAPITAL ONE SERVICES, LLC, McLean, VA (US)

(72) Inventors: Veena Yelamanchili, Plano, TX (US); Sriram Srinivasan, Frisco, TX (US); Janagaraj Ragupathy, McKinney, TX (US); Dinesh Vajala, Plano, TX (US); Brittany Courtney, Celina, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/239,204

(22) Filed: Jan. 3, 2019

(65) Prior Publication Data

US 2019/0138516 A1    May 9, 2019

Related U.S. Application Data

(63) Continuation of application No. 15/789,301, filed on Oct. 20, 2017, now Pat. No. 10,268,718.

(51) Int. Cl.
| | | |
|---|---|---|
| *G06F 7/00* | (2006.01) | |
| *G06F 17/00* | (2019.01) | |
| *G06F 16/23* | (2019.01) | |
| *G06F 16/951* | (2019.01) | |
| *G06F 16/93* | (2019.01) | |
| *G06F 3/0482* | (2013.01) | |

(52) U.S. Cl.
CPC ........ *G06F 16/2365* (2019.01); *G06F 3/0482* (2013.01); *G06F 16/93* (2019.01); *G06F 16/951* (2019.01)

(58) Field of Classification Search
CPC .... G06F 16/2365; G06F 16/93; G06F 16/951; G06F 3/0482
See application file for complete search history.

(56) References Cited

U.S. PATENT DOCUMENTS

| | | | |
|---|---|---|---|
| 2006/0265285 A1 | 11/2006 | Hamasaki | |
| 2009/0006349 A1* | 1/2009 | Fuxman | G06F 16/24556 |
| 2009/0049060 A1* | 2/2009 | Konik | G06F 16/217 |
| 2013/0091574 A1* | 4/2013 | Howes | G06Q 10/10 |
| | | | 726/24 |
| 2013/0346302 A1* | 12/2013 | Purves | G06Q 20/102 |
| | | | 705/40 |

* cited by examiner

*Primary Examiner* — Azam M Cheema
(74) *Attorney, Agent, or Firm* — Finnegan, Henderson, Farabow, Garrett & Dunner, LLP

(57) ABSTRACT

Methods and systems for query resolution through graphical user interfaces are disclosed. In one aspect, a system is disclosed that includes a processor and data storage including instructions that, when executed by the processor, cause the system to perform operations. The operations include receiving a query requesting resolution of inconsistent data; based on the query, creating an instance in a queue, where the instance identifies a priority and a task for the query; based on the priority, selecting the query from the queue and initiating resolution of the inconsistent data by generating a graphical user interface to accomplish the task; while accomplishing the task, generating each of (i) a documentation documenting the inconsistent data and the task and (ii) a resolution resolving the inconsistent data; storing the documentation; and publishing the resolution.

20 Claims, 12 Drawing Sheets

QUERY ID 12345

ACCOUNT NUMBER
123456789

BORROWER NAME
JOHN SMITH

DISPUTER
ABC, INC.

NATURE OF DISPUTE
------------------------------
------------------------------

INFORMATION CONSIDERED
------------------------------
------------------------------

RESOLUTION
------------------------------
------------------------------

METHODS AND SYSTEMS FOR QUERY RESOLUTION THROUGH GRAPHICAL USER INTERFACES

This application is a continuation of U.S. application Ser. No. 15/789,301, filed Oct. 20, 2017, currently pending, the contents of which are incorporated herein by reference.

BACKGROUND

In some cases, inconsistencies may appear in data dispersed between multiple entities. For example, a first entity may maintain first data that is inconsistent with second data maintained by a second entity. As another example, the first entity may dispute data maintained by the second entity. When inconsistencies appear in dispersed data, no single entity may have sufficient information to resolve the inconsistent data and, moreover, the entities may be ill-equipped to communicate data among one another. For example, a first entity may be unable to access second data maintained by a second entity, and the second entity may be unable to access first data maintained by the first entity. As another example, the first entity may be unable to access data maintained by the second entity.

In some cases, a third-party system may assist in resolving inconsistent data by collecting data from multiple entities. For example, a third-party system may collect data from each of a first entity and a second entity and, based on the collected data, resolve the inconsistent data. However, current third-party systems provide only limited insights into how a resolution is reached.

SUMMARY

The disclosed embodiments describe systems and methods for query resolution through graphical user interfaces.

In one aspect, a system is disclosed that includes a processor and data storage including instructions that, when executed by the processor, cause the system to perform operations. The operations include receiving a query from a querying entity requesting resolution of inconsistent data; based on the query, creating an instance in a queue, where the instance identifies a priority and a task for the query; based on the priority, selecting the query from the queue and initiating resolution of the inconsistent data by generating a graphical user interface to accomplish the task, where the graphical user interface is configured to receive an input associated with the task; while accomplishing the task, generating each of (i) a documentation documenting the inconsistent data, the task, and the input and (ii) a resolution resolving the inconsistent data; storing the documentation; and publishing the resolution.

In another aspect, a system is disclosed that includes a processor and data storage including instructions that, when executed by the processor, cause the system to perform operations. The operations include maintaining a queue including a plurality of queries requesting resolution of inconsistent data; selecting a query from the plurality of queries and identifying a task for the selected query; based on the task, generating a graphical user interface configured for resolution of the inconsistent data; receiving, through the graphical user interface, an input associated with the task; providing, through the graphical user interface, an output associated with the task; generating each of (i) a documentation documenting the inconsistent data, the task, the input, and the output, and (ii) a resolution resolving the inconsistent data; storing the documentation; and publishing the resolution.

Aspects of the disclosed embodiments may include non-transitory, tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 7 illustrates an exemplary documentation generated through a resolution process, consistent with disclosed embodiments.

DETAILED DESCRIPTION

Reference will now be made in detail to the disclosed embodiments, examples of which are illustrated in the accompanying drawings.

The disclosed systems, methods, and media describe systems and methods for query resolution through graphical user interfaces. In some embodiments, a query may be a query requesting resolution of inconsistent data. For example, a query may request resolution of inconsistent data included in a credit history or other record. In some embodiments, a query may be received from a querying entity, such as an individual other entity and/or one or more computing devices associated with an individual or other entity. For example, a query may be received from an individual associated with a credit history or other record. As another example, a query may be received from a credit reporting agency (e.g., Equifax, Experian, Innovis, or Transunion) or a credit data furnisher (e.g., a financial service provider) associated with a credit history or other record. Upon receipt of a query, the disclosed systems and methods generate graphical user interfaces through which one or more tasks may be accomplished to resolve the inconsistent data. The disclosed systems and methods may generate a resolution resolving the inconsistent data that may be published to the querying entity. In addition, the disclosed systems and methods may generate a documentation documenting the inconsistent data and the task that may be stored. The documentation may document how the inconsistent data was resolved.

Documentation and resolutions generated by the disclosed methods and systems may describe numerous aspects of the resolution process, including the query, the querying entity, the inconsistent data, tasks performed to resolve the inconsistent data, graphical user interfaces generated to accomplish the tasks, information retrieved to accomplish the tasks, and inputs received and/or outputs provided through the graphical user interfaces. As a result, compared to current third-party systems for resolving inconsistent data, the documentation and resolutions generated by the disclosed methods and systems provide improved insights into how a resolution is reached.

Figure 1:
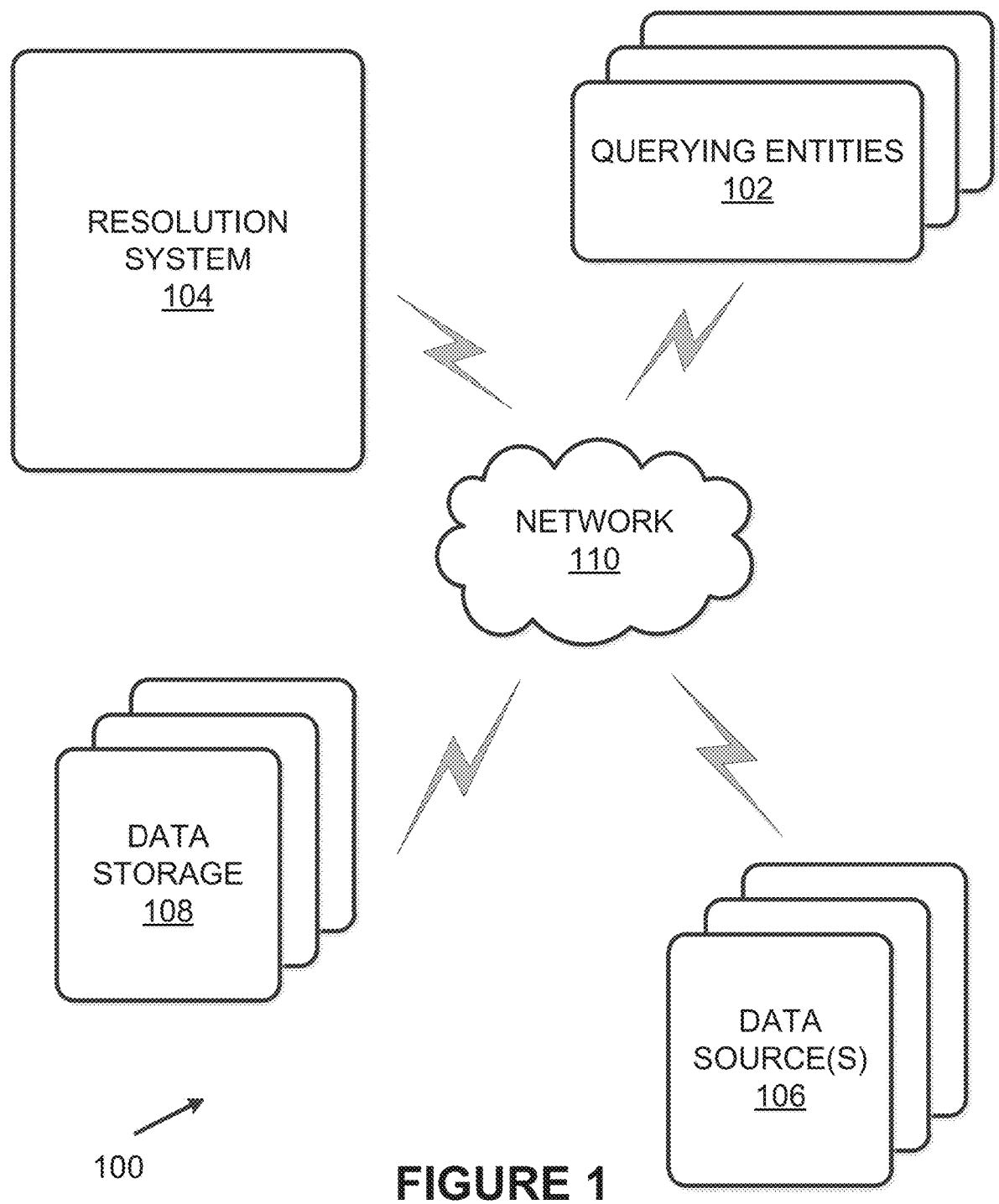
FIG. 1 is a block diagram of an exemplary system, consistent with disclosed embodiments.

FIG. 1 is a block diagram of an exemplary system 100, consistent with disclosed embodiments. System 100 may be configured for performing a resolution process consistent with disclosed embodiments.

As shown, system 100 may include one or more querying entities 102, a resolution system 104, one or more data source(s) 106, and data storage 108. As shown, querying entities 102, resolution system 104, data source(s) 106, and data storage 108 may be communicatively coupled by a network 110.

While only one resolution system 104 is shown, it will be understood that system 100 may include more than one resolution system 104 as well. Further, while certain numbers of querying entities 102, data source(s) 106, and data storage 108 are shown, it will be understood that system 100 may include more or fewer of these components as well. More generally, the components and arrangement of the components included in system 100 may vary. Thus, system 100 may include other components that perform or assist in the performance of one or more processes consistent with the disclosed embodiments.

Querying entities 102 may be one or more individuals, companies, and/or other entities (and/or one or more computing devices associated with such entities) from resolution system 104 receives queries. A query may, for example, request resolution of inconsistent data.

In some embodiments, a querying entity 102 may submit a query to resolution system 104 over network 110. For example, querying entity 102 may include and/or may be associated with a communication device configured to send the query to resolution system 104 over network 110. Alternatively or additionally, a querying entity 102 may submit a query to resolution system 104 over another communicative link, such as a paper-based connection (e.g., mail or fax) or a telephone connection distinct from network 110.

The query may be sent by a querying entity 102 as an individual query and/or as part of a batch process. For example, the query may be sent by querying entity 102 upon detection of inconsistent data. In some embodiments, querying entity 102 may be an individual, and the individual may send the query to resolution system 104 using a computing device (e.g., through a website or mobile application or by e-mail), by mail or fax, and/or by telephone upon detection of inconsistent data. As another example, the query may be sent by querying entity 102 with a batch periodically, upon collecting a threshold number of queries, and/or upon request of resolution system 104. In some embodiments, querying entity 102 may be a system configured to aggregate queries, such as the eOscar® system developed by Equifax, Experian, Innovis, and TransUnion. Such a querying entity 102 may be configured to send queries to resolution system 104 upon detection of inconsistent data or as part of a batch process executed at querying entity 102.

In some embodiments, a querying entity 102 may receive a resolution resolving the inconsistent data in the query from resolution system 104. The resolution may be generated through a resolution process at resolution system 104, as described below. In some embodiments, a querying entity 102 may receive the resolution over network 110 or over another communicative link, such as a paper-based connection (e.g., mail or fax) or a telephone connection distinct from network 110.

The resolution may be received by a querying entity 102 as an individual resolution and/or as part of a batch process. For example, the resolution may be received by querying entity 102 upon resolution of the query. In some embodiments, querying entity 102 may be an individual, and the individual may receive the resolution from resolution system 104 using a computing device (e.g., through a website or mobile application or by e-mail), by mail or fax, and/or by telephone upon resolution of the query. As another example, the resolution may be received by querying entity 102 with a batch periodically, upon collecting a threshold number of resolutions, and/or upon request of querying entity 102. In some embodiments, querying entity 102 may be a system configured to aggregate queries, such as the eOscar® system developed by Equifax, Experian, Innovis, and TransUnion. Such a querying entity 102 may be configured to receive resolutions from resolution system 104 upon resolution of each query or as part of a batch process executed at resolution system 104.

Resolution system 104 may be one or more computing devices configured to provide a resolution process as described herein. In some embodiments, resolution system 104 may be configured to receive queries from querying entities 102, as described above. For example, resolution system 104 may be configured to receive a query over network 110 and/or another communicative link distinct from network 110. For example, resolution system 110 may receive a query electronically (e.g., through a website or mobile application or by e-mail). As another example, resolution system 110 may receive a query over a paper-based connection (e.g., mail or fax) or a telephone connection distinct from network 110. In some embodiments, resolution system 110 may be configured to use optical character recognition and/or voice recognition to process queries received over a paper-based and/or telephone connection. For example, where a query is received as a letter from a querying entity 102, resolution system 104 may be configured to use an optical character recognition process to process the letter and determine the query. As another example, where a query is received by a telephone call from a querying entity 102, resolution system 104 may be configured to use a voice recognition process to process the telephone call and determine the query.

Resolution system 104 may receive queries individually and/or through a batch process. For example, the query may be received from querying entity 102 upon detection of inconsistent data by querying entity 102. In some embodiments, querying entity 102 may be an individual, and the individual may send the query to resolution system 104 using a computing device (e.g., through a website or mobile application or by e-mail), by mail or fax, and/or by telephone upon detection of inconsistent data. As another example, the query may be received from querying entity 102 in a batch periodically, upon querying entity 102 collecting a threshold number of queries, and/or upon request of resolution system 104. In some embodiments, querying entity 102 may be a system configured to aggregate queries, such as the eOscar® system developed by Equifax, Experian, Innovis, and TransUnion. Resolution system 104 may receive queries from such a querying entity 102 upon detection of inconsistent data at querying entity 102 or as part of a batch process executed at querying entity 102.

Resolution system 104 may be further configured to perform a resolution process, such as the resolution processes described below in connection with FIGS. 3 and 4. In some embodiments, to perform the resolution process, resolution system 104 may obtain information for use in the resolution process from one or more data source(s) 106. Information may include, for example, information associated with querying entity 102.

Data source(s) 106 may include one or more computing devices configured to maintain information for use in a resolution process. In some embodiments, one or more data source(s) 106 may take the form of servers or databases, such as Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s). Alternatively or additionally, data source(s) 106 may include cloud-based storage accessible by resolution system 104 over network 110 and/or another network.

In some embodiments, data source(s) 106 may aggregate information from one or more sources, such as one or more servers in network 110 and/or system 100. Alternatively or additionally, data source(s) 106 may be included in and/or otherwise associated with one or more such sources. In some embodiments, data source(s) 106 may aggregate data from, may be included in, and/or may be otherwise associated with a financial service entity that provides, maintains, manages, or otherwise offers financial services. For example, the financial service entity may be a bank, credit card issuer, or any other type of financial service entity that generates, provides, manages, and/or maintains user accounts for one or more customers. In some embodiments, user accounts may include, for example, credit card accounts, loan accounts, checking accounts, savings accounts, reward or loyalty program accounts, and/or any other type of financial service account. As another example, the financial service entity may be a credit reporting agency (e.g., Equifax, Experian, Innovis, or Transunion), a credit data furnisher (e.g., a financial service provider), or other type of financial service entity that generates, manages, and/or maintains credit ratings and/or credit reports for individuals. While data source(s) 106 are shown separately, in some embodiments some or all of data source(s) 106 may be included in and/or otherwise associated with resolution system 104, data storage 108, and/or another entity in network 110 and/or system 100.

In some embodiments, to perform the resolution process, resolution system 104 may further generate a resolution resolving the inconsistent data indicated in the query. An example resolution is further described below in connection with FIG. 7. The resolution may be published by resolution system 104 by, for example, sending the resolution to querying entity 102.

In some embodiments, resolution system 104 may send the resolution to querying entity 102 over network 110 or over another communicative link, such as a paper-based connection (e.g., mail or fax) or a telephone connection distinct from network 110. The resolution may be sent to querying entity 102 as an individual resolution and/or as part of a batch process. For example, the resolution may be sent to querying entity 102 upon resolution of the query. In some embodiments, querying entity 102 may be an individual, and resolution system 104 may send the resolution to the individual through a website or mobile application or by e-mail, by mail or fax, and/or by telephone upon resolution of the query. As another example, resolution system 104 may send the resolution to querying entity 102 with a batch periodically, upon collecting a threshold number of resolutions, and/or upon request of querying entity 102. In some embodiments, querying entity 102 may be a system configured to aggregate queries, such as the eOscar® system developed by Equifax, Experian, Innovis, and TransUnion. Resolution system 104 may be configured to send resolutions to such a querying entity 102 upon resolution of each query or as part of a batch process executed at resolution system 104.

In some embodiments, to perform the resolution process, resolution system 104 may further generate a documentation describing the resolution process. An example documentation is further described below in connection with FIG. 8. The documentation may be stored in data storage 108.

Data storage 108 may include one or more memory devices that store information and are accessed and/or managed through resolution system 104. By way of example, data storage 108 may include one or more database(s), such as Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s). Alternatively or additionally, data storage 108 may include cloud-based storage accessible by resolution system 104 over network 110 and/or another network. While data storage 108 is shown separately, in some embodiments data storage 108 may be included in and/or otherwise associated with resolution system 104, data source(s) 108, and/or another entity in network 110 and/or system 100.

Network 110 may be any type of network configured to provide communication between components of system 100. For example, network 110 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries may be defined so long as the specified functions and relationships thereof are appropriately performed. Alternatives (including equivalents, extensions, variations, deviations, etc., of those described herein)

will be apparent to persons skilled in the relevant art(s) based on the teachings contained herein. Such alternatives fall within the scope and spirit of the disclosed embodiments.

Figure 2:
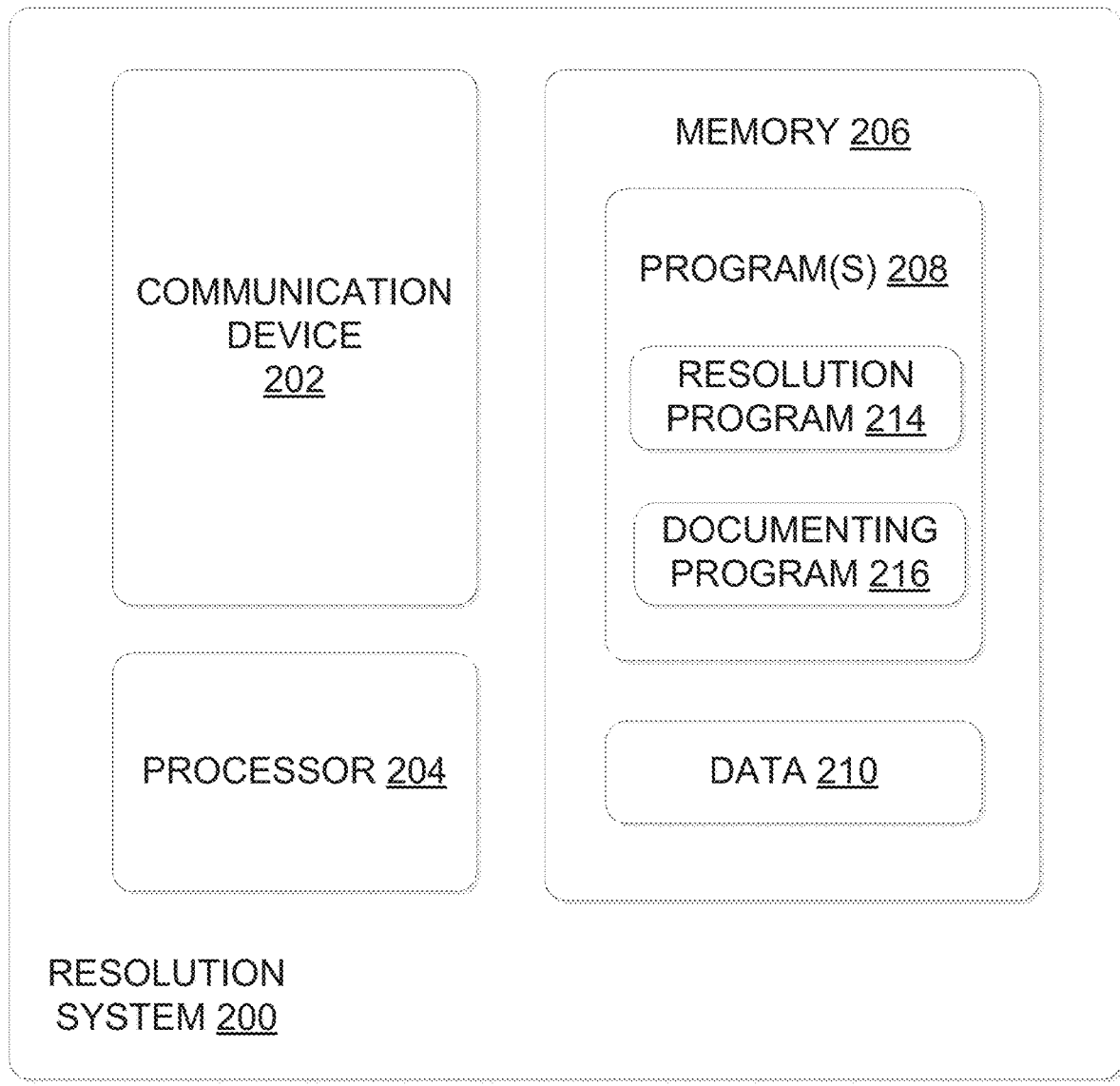
FIG. 2 is a block diagram of an exemplary resolution system, consistent with disclosed embodiments.

FIG. 2 is a block diagram of an exemplary resolution system 200, consistent with disclosed embodiments. As shown, resolution system 200 may include a communication device 202, one or more processor(s) 204, and memory 206 including one or more program(s) 208 and data 210.

Resolution system 200 may take the form of a server, general purpose computer, mainframe computer, or any combination of these components. Other implementations consistent with disclosed embodiments are possible as well. Resolution system 200 may, for example, be similar to resolution system 104 described above.

Communication device 202 may be configured to communicate with one or more entities. For example, in some embodiments, communication device 202 may be configured to communicate with one or more querying entities, such as querying entities 102 described above. In some embodiments, communication device 204 may be configured to communicate with the querying entities through a network, such as network 110 described above. Alternatively or additionally, communication device 204 may be configured to communicate with the querying entities through a web page, a mobile application, and/or e-mail. In some embodiments, communication device 204 may be configured to communicate with the querying entities through an optical character recognition and/or voice recognition process. Communication device 204 may communicate with the querying entities in other manners as well.

Communication device 202 may be configured to communicate with the querying entities to, for example, receive queries. The queries may be queries for resolution of inconsistent data. Communication device 202 may receive the queries individually and/or through a batch process, as described above. Communication device 204 may be further configured to communicate with the querying entities to, for example, publish resolutions generated by a resolution process, such as the resolutions processes described below in connection with FIGS. 3 and 4. The resolutions may resolve the inconsistent data associated with queries. Communication device 202 publish the resolutions individually and/or through a batch process, as described above.

In some embodiments, communication device 202 may be further configured to communicate with one or more data sources, such as data source(s) 106 described above. For example, resolution system 200 may be configured to obtain from the data sources, via communication device 202, information associated with the query, such as information associated with the querying entity and/or the inconsistent data, in connection with a resolution process, such as the resolutions processes described below in connection with FIGS. 3 and 4.

Alternatively or additionally, in some embodiments, communication device 202 may be configured to communicate with data storage, such as data storage 108 described above. For example, resolution system 200 may be configured to store in data storage documentations and/or resolutions generated during a resolution process, such as the resolutions processes described below in connection with FIGS. 3 and 4.

Communication device 202 may also be configured to communicate with other components. In general, communication device 202 may be configured to provide communication over a network, such as network 110 described above. To this end, communication device 202 may include, for example, one or more digital and/or analog devices that allow resolution system 200 to communicate with and/or detect other components, such as a network controller and/or wireless adaptor for communicating over the Internet. Other implementations consistent with disclosed embodiments are possible as well.

Processor(s) 204 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands required of different components of resolution system 200.

Memory 206 may include one or more storage devices configured to store instructions used by processor(s) 204 to perform functions related to disclosed embodiments. For example, memory 206 may be configured with one or more software instructions, such as program(s) 208, that may perform one or more operations when executed by processor(s) 204. The disclosed embodiments are not limited to separate programs or computers configured to perform dedicated tasks. For example, memory 206 may include a single program 208 that performs the functions of resolution system 200, or program(s) 208 may comprise multiple programs. Memory 206 may also store data 210 that is used by program(s) 208. In some embodiments, for example, data 210 may include queries, information for use in a resolution process, such as the resolution process described below in connection with FIGS. 3 and 4, and documentations, and/or resolutions generated through a resolution process, such as the resolution process described below in connection with FIGS. 3 and 4. Other data 210 is possible as well.

In certain embodiments, memory 206 may store sets of instructions for carrying out the resolution processes described below in connection with FIGS. 3 and 4. For example, as shown, memory 206 may include a resolution program 214 configured to generate resolutions and a documentation program 216 configured to generate documentations in connection with a resolution process, such as the resolution process described below in connection with FIGS. 3 and 4. Other instructions are possible as well. In general, instructions may be executed by processor(s) 206 to perform one or more processes consistent with disclosed embodiments.

The components of resolution system 200 may be implemented in hardware, software, or a combination of both hardware and software, as will be apparent to those skilled in the art. For example, although one or more components of resolution system 200 may be implemented as computer processing instructions, all or a portion of the functionality of resolution system 200 may be implemented instead in dedicated electronics hardware.

Resolution system 200 may include more, fewer, and/or different components than those shown. For example, in some embodiments, resolution system 200 may include and/or may be communicatively coupled to one or more display devices configured to provide output and/or display graphical user interfaces, such as the graphical user interfaces described below in connection with FIGS. 6A-6E. In some embodiments, such a display device may include a screen for displaying a graphical and/or text-based user interface, including but not limited to, liquid crystal displays (LCD), light emitting diode (LED) screens, organic light emitting diode (OLED) screens, and other known display devices. As another example, in some embodiments resolution system 200 may include and/or may be communicatively coupled to one or more digital and/or analog devices configured to receive input, such as a touch-sensitive area, keyboard, buttons, or microphones. Other components are possible as well.

Figure 3:
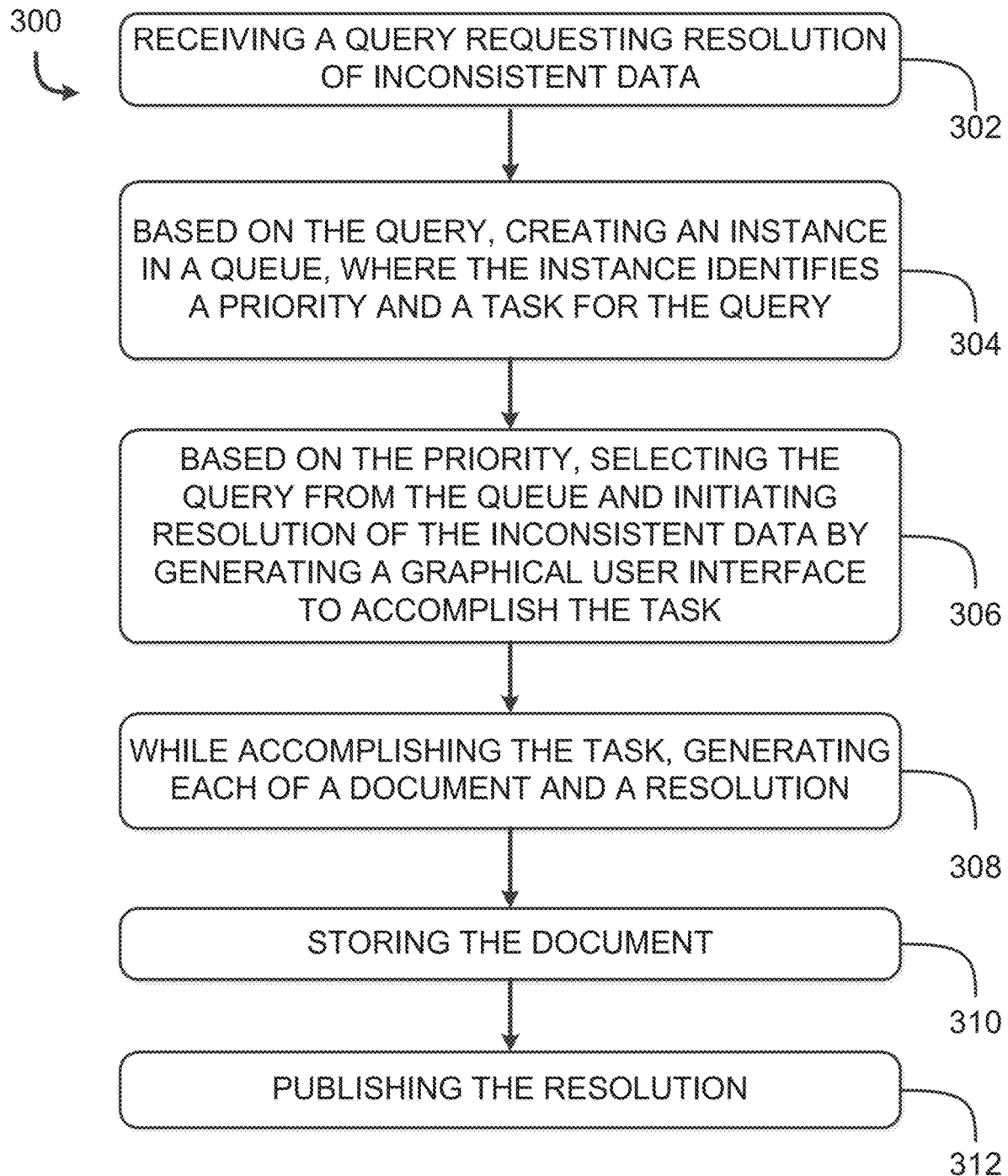
FIG. 3 is a flowchart of an exemplary resolution process, consistent with disclosed embodiments.

FIG. 3 is a flowchart of an exemplary resolution process 300, consistent with disclosed embodiments. Resolution process 300 may be carried out by a resolution system, such as resolution systems 104 and 200 described above.

As shown in FIG. 3, resolution process 300 includes at step 302 receiving a query for a resolution and assigning the query to a queue. The query may be, for example, a query for resolution of inconsistent data. In some embodiments, the query may be received from a querying entity, such as any of querying entities 102 described above. For example, the query may be received from an individual and may request resolution of inconsistent data included in a credit history for the individual. As another example, the query may be received from a credit reporting agency, a credit data furnisher, or another entity and may request resolution of inconsistent data associated with a potential fraud. The query may be received in any of the manners described above in connection with communication device 202.

At step 304, resolution process 300 further includes, based on the query, creating an instance in a queue, where the instance identifies a priority and a task for the query. The task may describe information, inputs, and/or outputs through which the inconsistent data may be resolved. For example, the task may describe information to be retrieved by the resolution system to resolve the inconsistent data, such as information from data storage (e.g., data storage 108 described above) and/or one or more remote entities (e.g., data source(s) 106 described above). As another example, the task may describe inputs to be received and/or outputs to be provided, such as through a graphical user interface, to resolve the inconsistent data. The inputs and/or outputs may be received from and/or provided to, for example, an operator of the resolution system. The instance may identify a single task for resolution of the inconsistent data, or the instance may identify multiple tasks for resolution of the inconsistent data.

The priority may indicate a priority with which the query is to be resolved by the resolution system relative to other queries. In some embodiments, the priority may be identified based on a date the query is received. For example, the queue may be a first-in-first-out queue or a last-in-first-out queue. As another example, a deadline for resolving the query may be determined based on the date the query is received, and the priority may identified based on the deadline (e.g., queries with sooner deadlines may have higher priority than queries with later deadlines). Alternatively or additionally, the priority may be identified based on the identified task. For example, a higher priority may be identified for certain tasks than for others (e.g., simpler tasks may be assigned a higher priority than more complex tasks). Still alternatively or additionally, identifying the priority may rely in whole or in part on randomization. The priority may be identified in other manners as well.

In some embodiments, the resolution system may maintain the queue in data storage, such as data storage 108 or data 210 described above. The resolution system may maintain a single queue for queries or may maintain more than one queue. In some embodiments, the resolution system may assign the query to a queue based on the query, the querying entity, and/or the inconsistent data. Alternatively or additionally, the resolution system may assign the query to a queue based on the priority and/or the task identified for the query. The resolution system may assign the query in other manners as well.

At step 306, resolution process 300 further includes, based on the priority, selecting the query from the queue and initiating resolution of the inconsistent data by generating a graphical user interface to accomplish the task. In some embodiments, the graphical user interface may be configured to, for example, receive inputs and/or provide outputs according to the task to resolve the inconsistent data. For example, the graphical user interface may include a field, drop-down menu, or other input mechanism to receive an input associated with the task. As another example, the graphical user interface may be include a text-based and/or graphic output mechanism to provide an output associated with the task. The inputs and/or outputs may be received from and/or provided to, for example, an operator of the resolution system.

In some embodiments, accomplishing the task may involve the resolution system retrieving information from data storage (e.g., data storage 108 described above) and/or one or more remote entities (e.g., data source(s) 106 described above). The graphical user interface may be configured to display and/or may be otherwise based on the retrieved information. For example, the graphical user interface may include a text-based and/or graphic representation (e.g., image, chart, graph, etc.) of some or all of the retrieved information. Example graphical user interfaces are further described below in connection with FIGS. 6A-6E.

Resolution process 300 further includes, at step 308, while accomplishing the task, generating each of a documentation and a resolution. The documentation may be a documentation describing the inconsistent data and/or the task. An example documentation is further described below in connection with FIG. 8. The resolution may be a resolution resolving the inconsistent data. An example resolution is further described below in connection with FIG. 7. The documentation and/or the resolution may include text-based and/or graphic representations (e.g., images, charts, graphs, etc.) based on the inconsistent data, the task, the resolution, any retrieved information, any inputs and/or outputs, and/or any generated graphical user interfaces.

In some embodiments, as noted above, accomplishing the task may involve the resolution system retrieving information from data storage (e.g., data storage 108 described above) and/or one or more remote entities (e.g., data source(s) 106 described above). The documentation and/or the resolution may include, may describe, and/or may be based on the retrieved information as well.

Alternatively or additionally, in some embodiments, as described above, accomplishing the task may involve the resolution system receiving inputs and/or providing outputs through a graphical user interface according to the task to resolve the inconsistent data. The documentation and/or the resolution may include, may describe, and/or may be based on the inputs, the outputs, and/or the graphical user interface.

Resolution process 300 further includes, at step 310, storing the documentation. The resolution system may store the documentation in, for example, data storage (e.g., data storage 108 described above) and/or at one or more remote entities (e.g., data source(s) 106 described above). In some embodiments, the documentation may be searchable and/or retrievable based on some or all of the contents of the documentation. For example, the documentation may be searchable based on the query, the inconsistent data, the priority, the task, any retrieved information, inputs, and/or outputs used to accomplish the task, and/or the resolution. The documentation may be searchable based on other information as well, such as an operator from whom input was received and/or a remote entity from which information was received. In some embodiments, the data storage and/or remote entity storing the documentation may include computing components (e.g., management system, server, etc.) configured to receive and process requests for stored data and to provide data from the database(s).

Resolution process 300 further includes, at step 312, publishing the resolution. The resolution system may publish the resolution to, for example, the querying entity and/or one or more other entities. For example, the resolution system may publish the resolution to a remote entity from which information was retrieved to accomplish the task. As another example, where the query requested resolution of inconsistent data included in an individual's credit history, the resolution may be published to the individual, a credit reporting agency, a credit data furnisher, and/or another entity. The resolution may be published in any of the manners described above in connection with communication device 202.

Publishing the resolution may involve sending the resolution (e.g., by e-mail, mail, fax, telephone, etc.) and/or making the resolution available (e.g., through a webpage and/or mobile application). For example, in some embodiments publishing the resolution may involve generating a documentation describing the resolution and sending and/or making available the documentation. The resolution may be published in other manners as well.

While the foregoing described the documentation as being stored and the resolution as being published, in some embodiments the documentation may alternatively or additionally be published, and the resolution may alternatively or additionally be stored.

Figure 4:
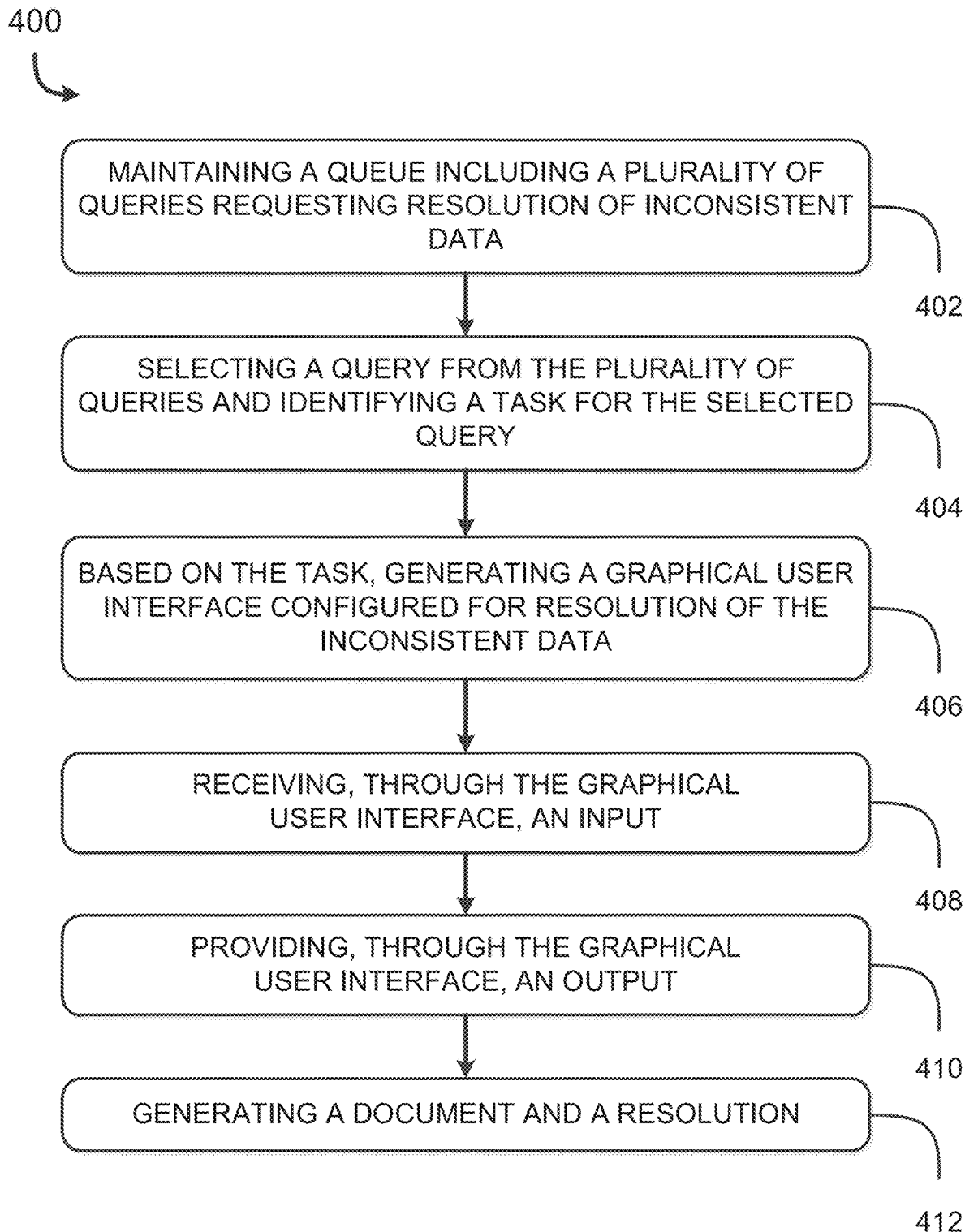
FIG. 4 is a flowchart of another exemplary resolution process, consistent with disclosed embodiments.

FIG. 4 is a flowchart of another exemplary resolution process 400, consistent with disclosed embodiments. Resolution process 400 may be carried out by a resolution system, such as resolution systems 104 and 200 described above.

As shown in FIG. 4, resolution process 400 includes at step 402 maintaining a queue including a plurality of queries requesting resolution of inconsistent data. The queries may take any of the forms described above. The queries may be received from the same querying entity and/or from multiple querying entities. The queries may have been received by resolution system in any of the manners described above in connection with communication device 202.

Resolution process 400 further includes, at step 404, selecting a query from the plurality of queries and identifying a task for the selected query. In some embodiments, the resolution system may select the selected query based on a priority identified for the query. The priority may be identified in any of the manners described above in connection with resolution process 300. Alternatively or additionally, in some embodiments the resolution system may select the selected query based in whole or in part on randomization. Still alternatively or additionally, in some embodiments the resolution system may select the selected query in whole or in part based on input received from an operator of the resolution system (e.g., the operator may select the query or a querying entity from a drop-down menu or the operator may indicate a type of inconsistent data). The query may be selected in other manners as well.

The resolution system may identify a task for the selected query based on the selected query, the querying entity, and/or the inconsistent data. In some embodiments, the task may be identified based on an optical character and/or voice recognition process. For example, the query may be received by mail, and an optical character recognition process may be used to recognize characters included in the query. Based on the recognized query, the resolution system may identify the querying entity and the inconsistent data and, based on the querying entity and/or the inconsistent data, identify a task.

At step 406, resolution process further includes, based on the task, generating a graphical user interface configured for resolution of the inconsistent data. The graphical user interface may take any of the forms described above in connection with resolution process 300. Example graphical user interfaces are further described below in connection with FIGS. 6A-6E.

Resolution process 400 further includes, at step 408, receiving, through the graphical user interface, an input. The input may be received from, for example, an operator of the resolution system. In some embodiments, the graphical user interface may be configured to, for example, receive inputs according to the task to resolve the inconsistent data. For example, the graphical user interface may include a field, drop-down menu, or other input mechanism to receive an input associated with the task. Inputs are further described below in connection with the example graphical user interfaces of FIGS. 6A-6E.

Resolution process 400 further includes, at step 410, providing, through the graphical user interface, an output. The output may be provided to, for example, an operator of the resolution system. In some embodiments, the graphical user interface may be configured to, for example, provide the outputs according to the task to resolve the inconsistent data. For example, the graphical user interface may include a text-based and/or graphic output mechanism to provide an output associated with the task. Outputs are further described below in connection with the example graphical user interfaces of FIGS. 6A-6E.

In some embodiments, accomplishing the task may involve the resolution system retrieving information associated with the selected query from data storage (e.g., data storage 108 described above) and/or one or more remote entities (e.g., data source(s) 106 described above), as described above. In some embodiments, the graphical user interface, the inputs, and/or the outputs may be based on the retrieved information.

Resolution process 400 further includes, at step 412, generating a documentation and a resolution. The documentation and the resolution may take any of the forms described above in connection with resolution process 300. In some embodiments, the documentation and/or the resolution may be published and/or stored, as described above in connection with resolution process 300.

Figure 5:
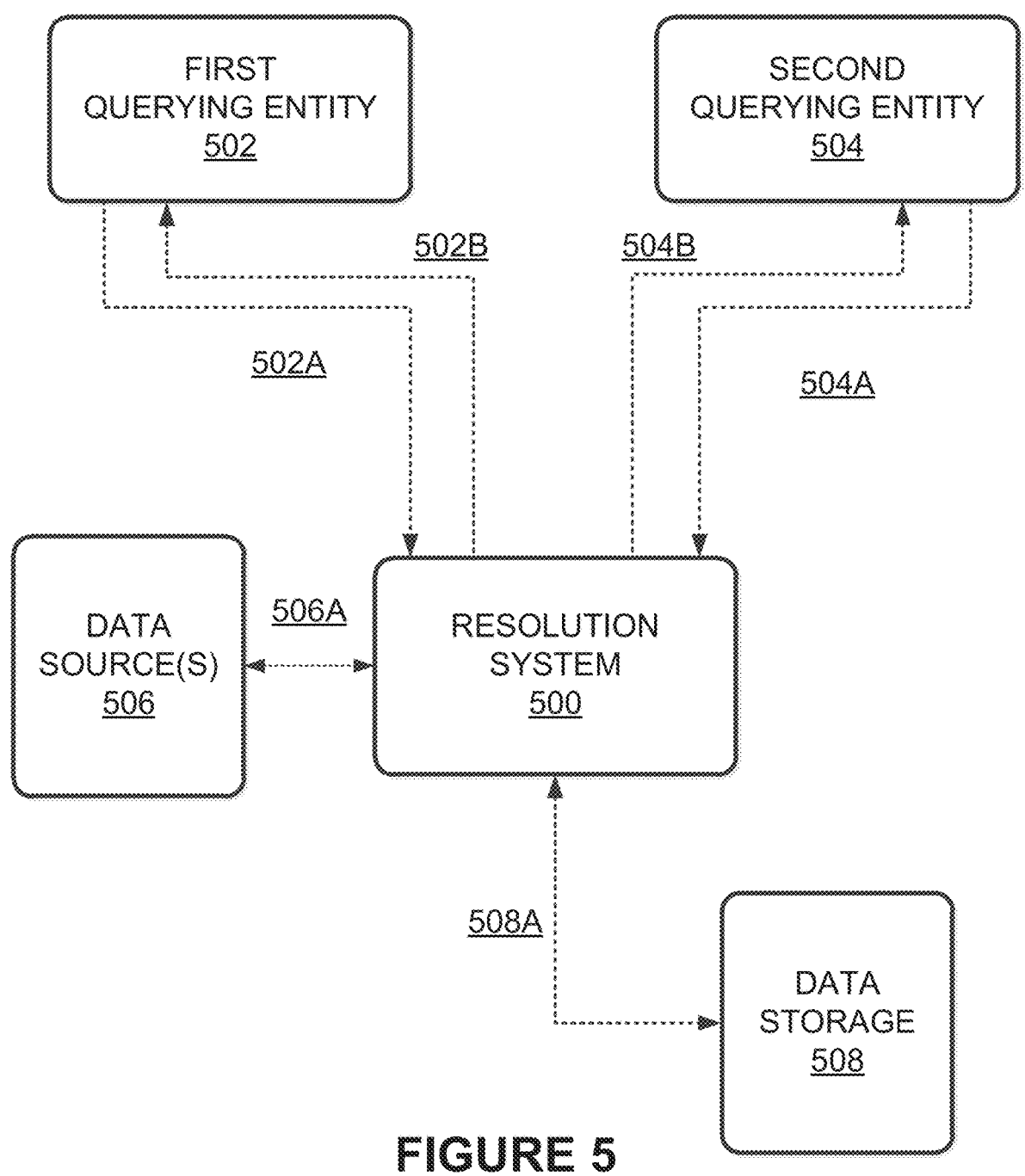
FIG. 5 illustrates an exemplary resolution process, consistent with disclosed embodiments.

FIG. 5 illustrates an exemplary resolution process, consistent with disclosed embodiments. While the resolution process is described with respect to resolution system 500, first querying entity 502, second querying entity 504, data source(s) 506, and data storage 508, it will be understood that other resolution systems, querying entities, data sources, and data storage are possible as well.

Resolution system 500 may take any of the forms described above for resolution systems 104 and 200. Resolution system 500 may be configured to maintain one or more queues including queries. The queues may be maintained at resolution system 500 and/or in data storage accessible by resolution system 500, such as data storage 508.

As shown, resolution system 500 may receive a first query 502A from first querying entity 502. Resolution system 500 may further receive a second query 504A from second querying entity 504. First querying entity 502 and second querying entity 504 may take any of the forms described above for querying entities 102.

First query 502A may be a query requesting resolution of inconsistent data. For example, first querying entity 502 may be an individual, and first query 502A may be a query requesting resolution of inconsistent data on the individual's credit history. First query 502A may be received through, for example, a webpage or a mobile application. Alternatively, first query 502A may be received by mail, by fax, or by telephone. In some embodiments, resolution system 500 may identify the second querying entity 504, the inconsistent data, a task, and/or a priority for first query 502A, as described above. For example, resolution system 500 may use optical character and/or voice recognition to identify the first querying entity 502, the inconsistent data, a task, and/or a priority for first query 502A. For example, resolution system 500 may use optical character recognition to identify inconsistent data, such as a credit inquiry or a late payment on a credit card the individual claims did not occur. As another example, resolution system 500 may use voice recognition to identify a task by recognizing key words used in the query.

Second query 504A may be a query requesting resolution of inconsistent data. For example, second querying entity 504 may be a system configured to aggregate queries, such as the eOscar® system developed by Equifax, Experian, Innovis, and TransUnion, and second query 504A may be a query received through a batch process at second querying entity 504. Second query 504A may request resolution of inconsistent data, such as a transaction claimed to be fraudulent by an individual. In some embodiments, second querying entity 504 may have received the query from the individual and/or a credit data furnisher. In some embodiments, resolution system 500 may identify the second querying entity 504, the inconsistent data, a task, and/or a priority for first query 502A, as described above.

Based on the first query 502A and the second query 504B, resolution system 500 may create a first instance and a second instance, respectively, in a queue. The first instance and the second instance may be in the same queue or in different queues. In some embodiments, the resolution system 500 may assign the first query 502A and the second query 504A to a queue based on one or more of the identified querying entity, inconsistent data, task, and/or priority. For example, the first query 502A and the second query 504A may be assigned to the same queue if the identified tasks for the queries are the same. As another example, the first query 502A and the second query 504A may be assigned to different queues because the querying entities are different.

In some embodiments, the first query 502A and the second query 502B may be assigned to the same queue, and resolution system 500 may select one of first query 502A and second query 504B from the queue based on the identified priorities. For example, where first query 502A was received by resolution system 200 before second query 504A, first query 502A may have a higher priority than second query 504A and may be selected before second query 504A. As another example, where the task identified for first query 502A has an earlier deadline than the task identified for second query 504A, first query 502A may have a higher priority than second query 504A and may be selected before second query 504A.

In some embodiments, resolution system 500 may select first query 502A and initiate resolution of the inconsistent data of first query 502A. For example, resolution system 500 may, based on the identified task for first query 502A, generate a graphical user interface configured for resolution of the inconsistent data of first query 502A. Through the graphical user interface, resolution system 500 may receive inputs, such as inputs from an operator of resolution system 500. Alternatively or additionally, through the graphical user interface, resolution system 500 may provide outputs, such as outputs to an operator of resolution system 500. The inputs and outputs may take any of the forms described above. Still alternatively or additionally, resolution system 500 may retrieve information associated with the query from a remote entity. For example, resolution system 500 may retrieve information from data source(s) 506 through one or more requests 506A, as shown. The graphical user interface may include the retrieved information, the inputs, and/or the outputs, as described above.

Through the graphical user interface, an operator of resolution system 500 may accomplish the task identified for the first query 502A. While accomplishing the task, resolution system 500 may generate each of a documentation and a resolution, as described above. Resolution system 500 may store the documentation in, for example, data storage 508 at 508A. Alternatively or additionally, resolution system 500 may publish the documentation to one or more entities, such as first querying entity 502, another querying entity such as second querying entity 504, one or more data source(s) 506, or another entity. Resolution system 500 may further publish 502B the resolution to first querying entity 502. For example, resolution system 500 may send the resolution (e.g., a documentation describing the resolution) to first querying entity 502 through a webpage or mobile application, by e-mail, mail, fax, or telephone. In some embodiments, resolution system 500 may store the resolution as well.

In some embodiments, resolution system 500 may further select second query 504A and initiate resolution of the inconsistent data of second query 504A. For example, resolution system 500 may, based on the identified task for second query 504A, generate a graphical user interface configured for resolution of the inconsistent data of second query 504A. Through the graphical user interface, resolution system 500 may receive inputs and/or outputs, as described above Alternatively or additionally, resolution system 500 may retrieve information associated with the query from a remote entity, as described above. The graphical user interface may include the retrieved information, the inputs, and/or the outputs, as described above.

Through the graphical user interface, an operator of resolution system 500 may accomplish the task identified for the second query 504A. While accomplishing the task, resolution system 500 may generate each of a documentation and a resolution, as described above. Resolution system 500 may store and/or publish the documentation, as described above. Resolution system 500 may further publish 504B the resolution to second querying entity 504. For example, resolution system 500 may send the resolution (e.g., a documentation describing the resolution) to second querying entity 504 through a batch process. In some embodiments, resolution system 500 may store the resolution as well.

FIGS. 6A-6E illustrate exemplary graphical user interfaces in a resolution process, consistent with disclosed embodiments. The graphical user interfaces may be generated by a resolution system, such as resolution systems 104 and 200 described above.

The resolution system may maintain a queue of queries requesting resolution of inconsistent data, as described above. When a query is received, the resolution system may create an instance in a queue based on the query. In some embodiments, the resolution system may assign an identifier to the query, such as a query ID, and the instance may include information received in the query. The resolution system may further identify a task for the query, as described above. Based on the task, the resolution system may generate a graphical user interface to accomplish the task, such as graphical user interface 600 shown in FIG. 6A.

As shown, graphical user interface 600 may include indications 602A, 602B, and 602C of information received in the query, such as an "Account Number", a "Borrower Name", and a "Disputer". Graphical user interface 600 could include indications of other information received in the query as well, or information based on the information in the query, or other information. Graphical user interface 600 may further include an indication of a query ID 604 assigned to the query, as well as an indication of the task 606 identified for the query, as described above.

In some embodiments, graphical user interface 600 may include one or more inputs to receive information about resolution of the query. For example, as shown, graphical user interface 600 may include a text-based input 608 to receive text describing the query and/or the resolution process. For instance, as shown, an operator of the resolution system may use the text-based input 608 to provide text describing the query and/or the resolution process, such as a manner in which the query was received ("Query received by telephone"). Text provided through the text-based input may be associated with the query and/or displayed in the graphical user interface 600.

As another example, as shown, graphical user interface 600 may include an image-based input 610 to receive images describing the query and/or the resolution process. The image-based input 610 may be configured to receive images associated with the resolution process, such as images included in the query, images retrieved from other data sources, screenshots of graphical user interfaces used in the resolution process, and/or images generated as part of the resolution process, such as outputs provided through the graphical user interfaces. In some embodiments, as shown in graphical user interface 612 in FIG. 6B, the image-based input, when selected, may provide a pop-up window 614 through which an operator of the resolution system can select a type of image to associate with the query. Images provided through the image-based input may be associated with the query and/or displayed in the graphical user interface 612.

Figure 6A:
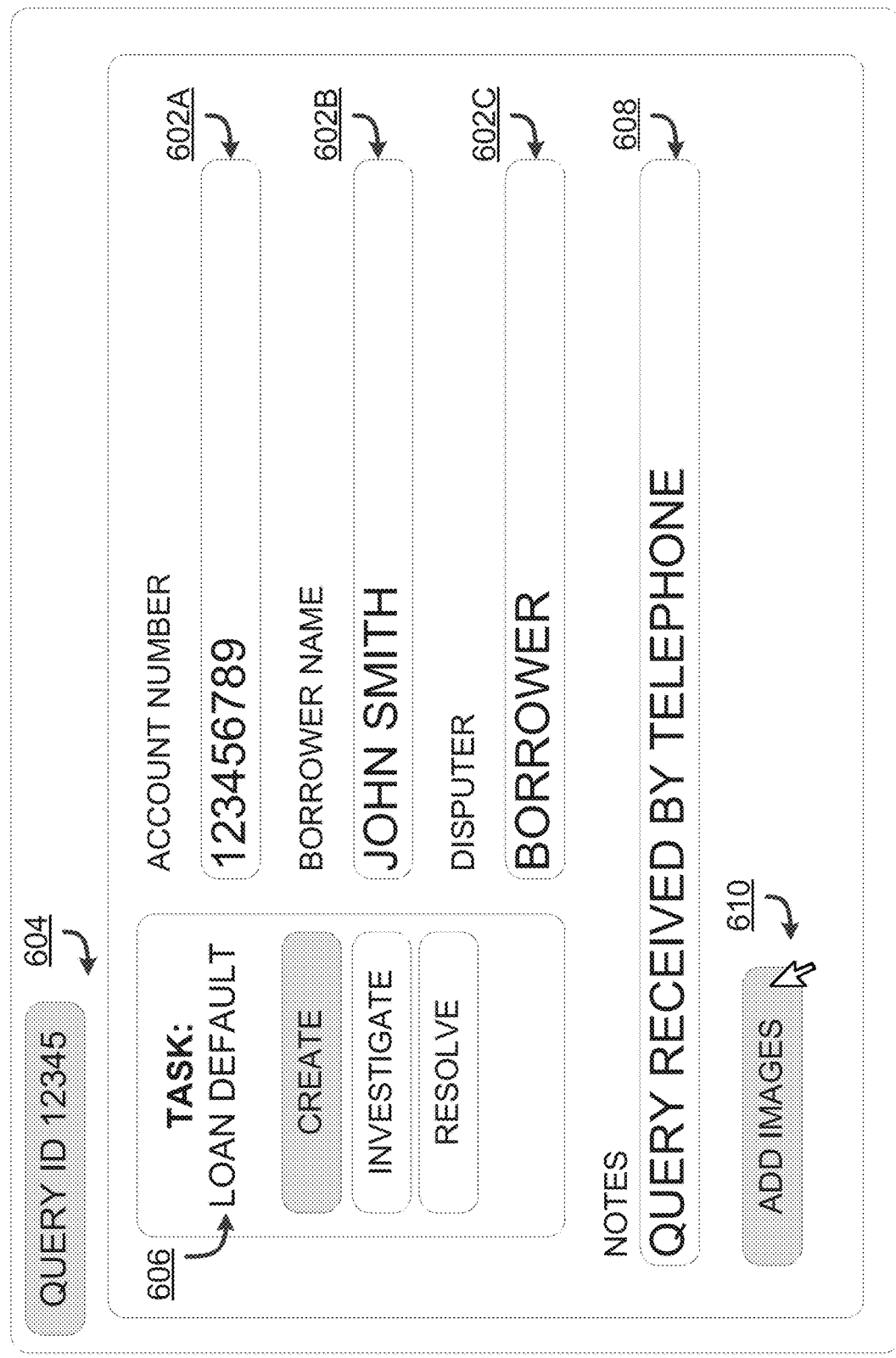
FIGS. 6A-6E illustrate exemplary graphical user interfaces in a resolution process, consistent with disclosed embodiments.
Figure 6B:
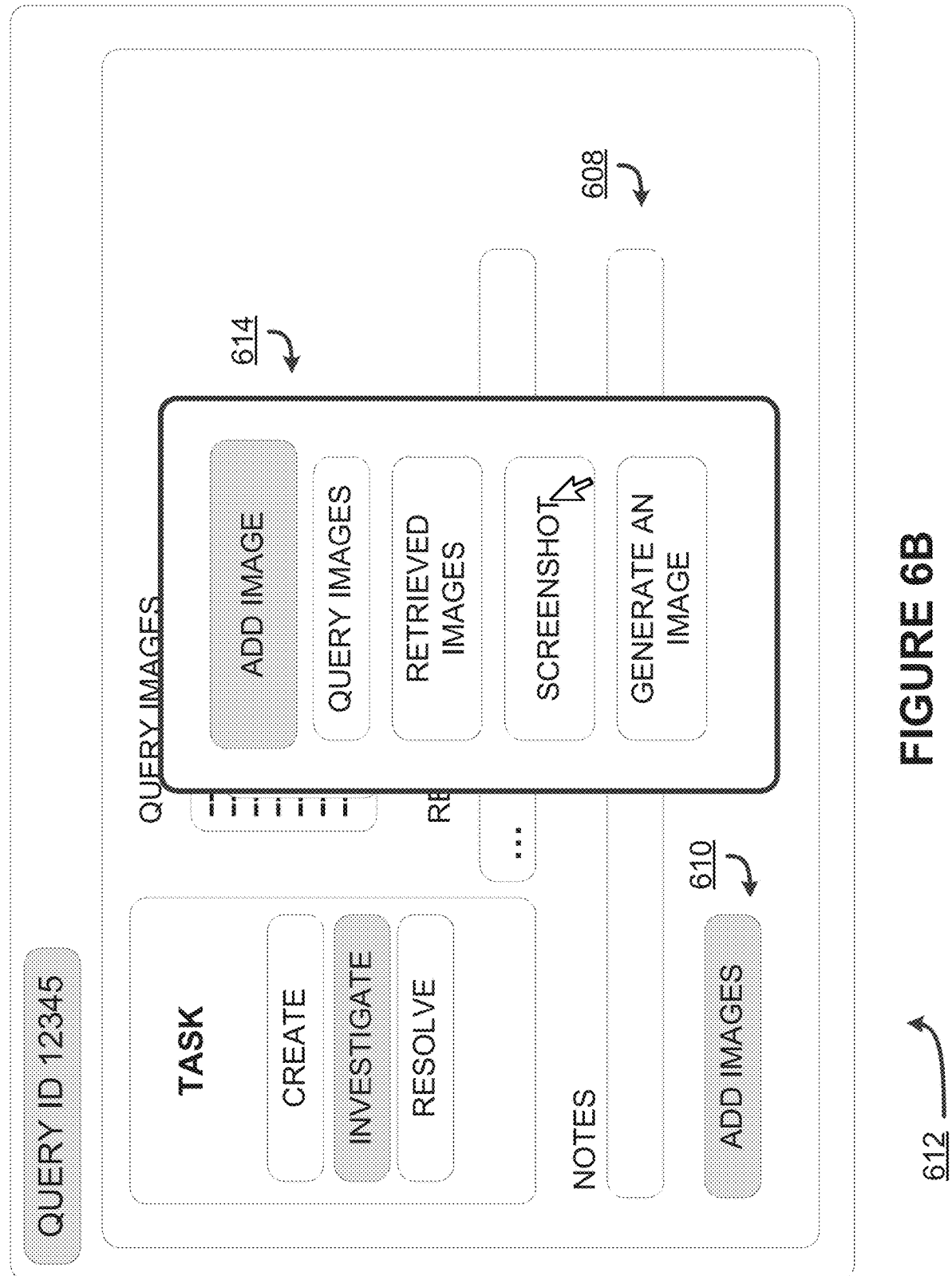
Figure 6C:
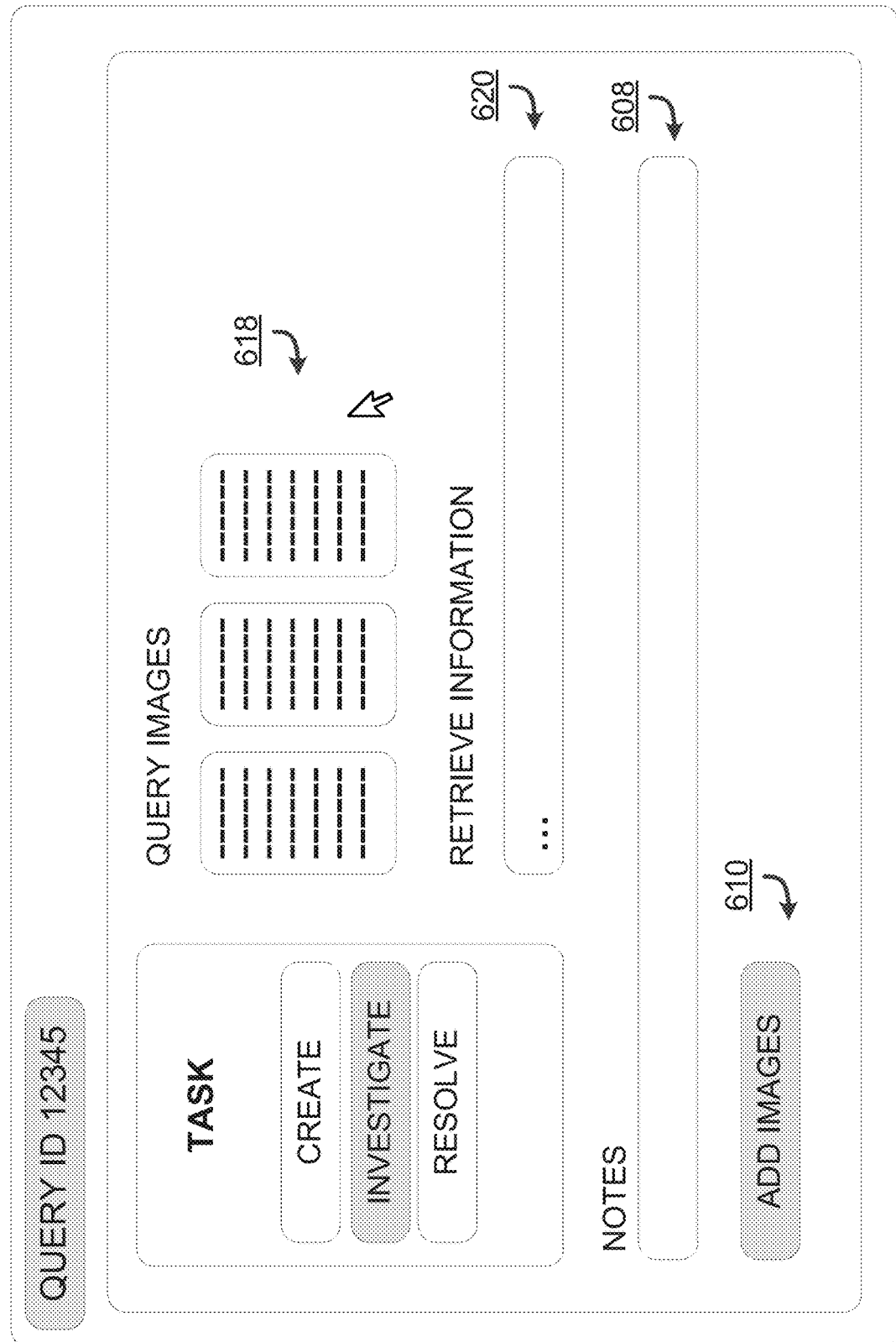

FIG. 6C depicts another graphical user interface 616 that may be generated by the resolution system. Graphical user interface 616 may similarly include text-based input 608 and image-based input 610. As shown, graphical user interface 616 may include or more query images 618 associated with the query. The query images 618 may include, for example, images included with the query and/or images added through an image-based input, as described above. In some embodiments, the images may include, for example, images of graphical user interface, e-mail, letter, or other instrument through which the query was received from a querying entity or images of information received with the query, such as images of a credit history. Other query images 618 are possible as well.

Graphical user interface 616 may further include an input 620 through which an operator of the resolution system may retrieve information for use in resolving the query. In some embodiments, through input 620, the operator may retrieve information associated with the query from data storage (e.g., data storage 108 described above) and/or one or more remote entities (e.g., data source(s) 106 described above), as described above. The retrieved information may include text-based and/or image-based information associated with the query. Retrieved information may be associated with the query and/or displayed in graphical user interface 616.

In some embodiments, resolution system may retrieve information by sending a request or query to the data storage and/or remote entities and receiving the information in response. While graphical user interface 616 depicts an input 620 for retrieving information, in some embodiments some or all of the information may be retrieved by the resolution system without input from an operator. For example, the resolution system may automatically retrieve information from data storage and/or remote entities based on the query and/or the identified task.

Figure 6D:
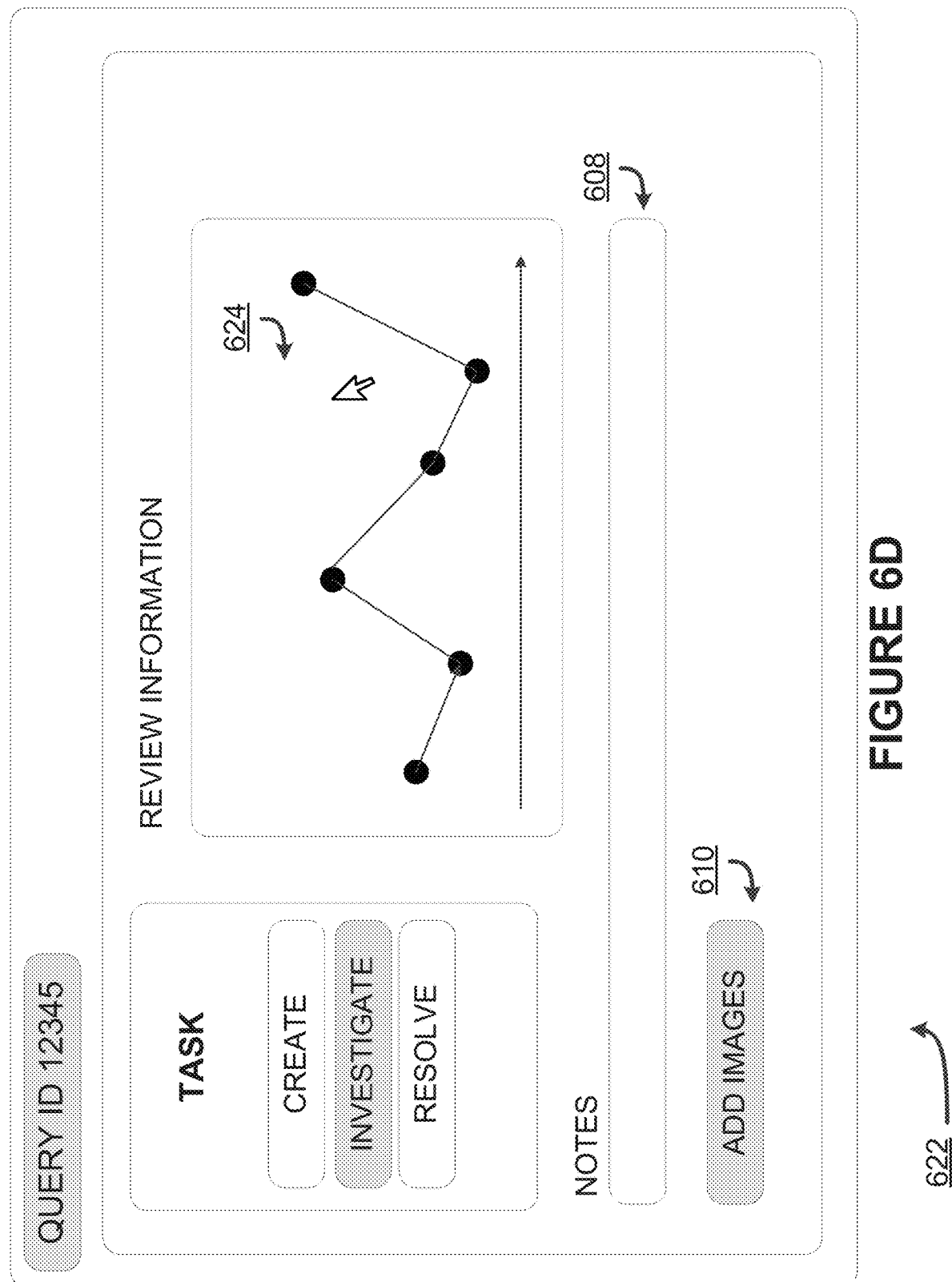

FIG. 6D depicts another graphical user interface 622. As shown, graphical user interface 622 includes an output 624. Graphical user interface 622 may similarly include text-based input 608 and image-based input 610. In some embodiments, the resolution system may generate the output based on the query, the querying entity, the inconsistent data, the identified task, one or more inputs, and/or some or all of the retrieved information. The output 624 may be a text-based output, such as a description of the identified task and/or the querying entity. Alternatively or additionally, the output 624 may be an image-based output, such as a chart or graph generated based on retrieved information. The output 624 may be associated with the query.

Figure 6E:
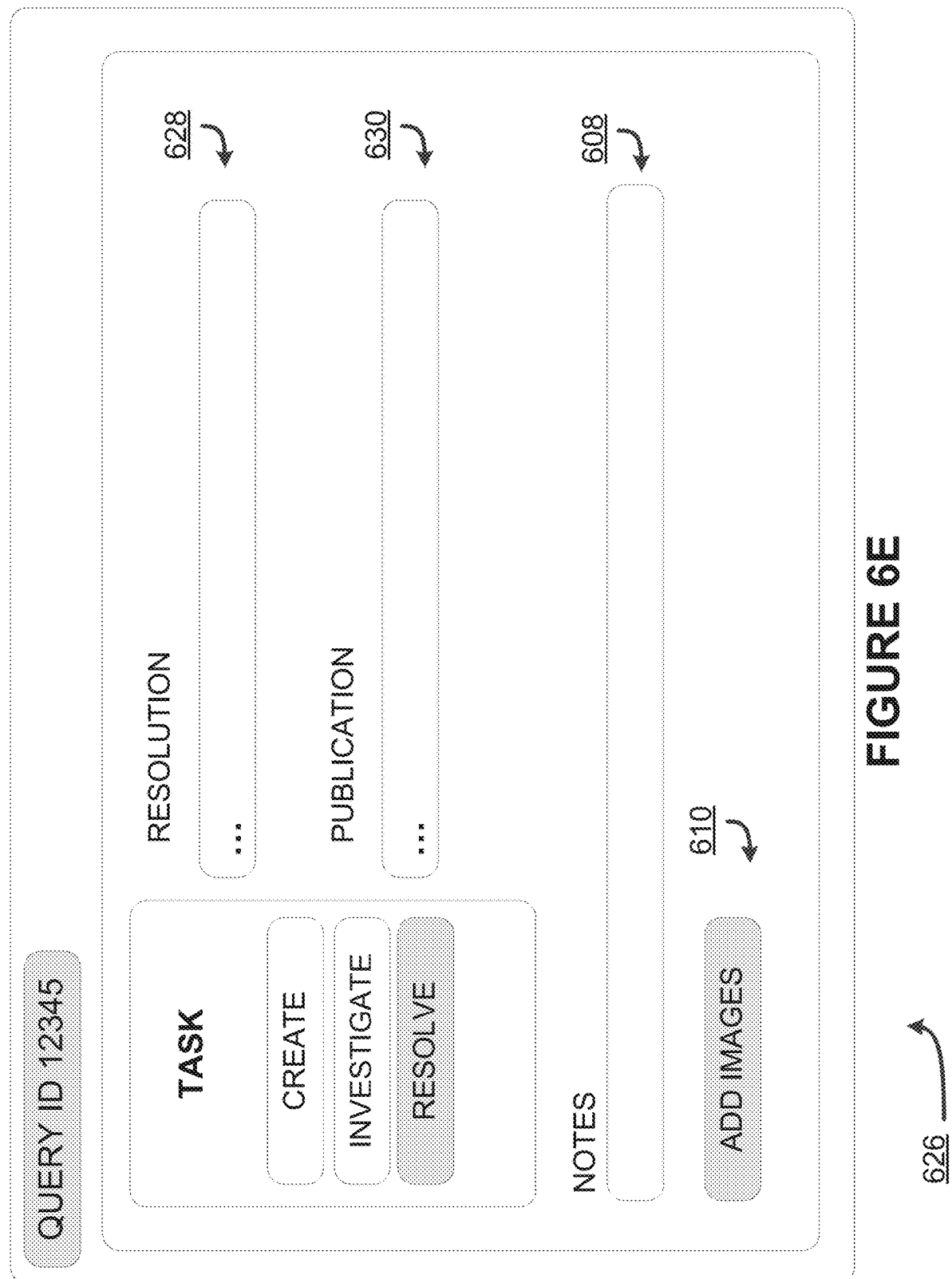

FIG. 6E depicts another graphical user interface 626. As shown, graphical user interface 626 may similarly include text-based input 608 and image-based input 610. In some embodiments, graphical user interface 626 may include an input 628 through which an operator of the resolution system 628 may provide a resolution of the query. For example, the operator may select the resolution from a drop-down menu and/or may provide a text-based input through input 628. Alternatively or additionally, in some embodiments the resolution system may determine the resolution automatically based on the query, the querying entity, the inconsistent data, the identified task, one or more inputs, and/or some or all of the retrieved information, and graphical user interface 626 may display the resolution. The resolution system may associate the resolution with the query and/or display the resolution in graphical user interface 626.

In some embodiments, graphical user interface 626 may further include an input 630 through which an operator may provide a publication for the query. For example, the operator may select one or more entities to which the resolution should be published and/or one or more manners of publication from a drop-down menu and/or may provide a text-based input through input 630. Alternatively or additionally, in some embodiments the resolution system may publish the resolution automatically based on the query, the querying entity, the inconsistent data, the identified task, one or more inputs, and/or some or all of the retrieved information, and graphical user interface 626 may display an indication of the publication, such as an image-based description of the publication (e.g., an image of a graphical user interface, e-mail, letter, or other instrument used to publish the resolution) and/or a text-based description of the publication (e.g., text naming a querying entity to which the resolution was published and/or a date on which the resolution was published). The resolution system may associate the publication with the query and/or display the publication in graphical user interface 626.

FIG. 7 illustrates an exemplary resolution 700 generated through a resolution process, consistent with disclosed embodiments. In some embodiments, resolution 700 may be generated based on one or more of graphical user interfaces 600, 612, 614, 622, and 626, text-based and/or image-based inputs and outputs, retrieved information, the query ID, the querying entity, and/or the identified task. Resolution 700 may take the form of a graphical user interface and/or other data provided through a web page and/or a mobile application, information (e.g., a document) provided by e-mail, mail, and/or fax, or information provided by telephone. Alternatively or additionally, resolution 700 may be data stored in data storage accessible by the resolution system and/or the querying entity or other entities. The resolution 700 may take other forms as well.

As shown, resolution 700 may include a description 702 of how the inconsistent data was resolved. Additionally, resolution 700 may include other information associated with the query by the resolution system during the resolution process, such as the query, the querying entity, the inconsistent data, the identified task, one or more inputs, and/or some or all of the retrieved information. Resolution 700 may include other information as well.

Figure 8:
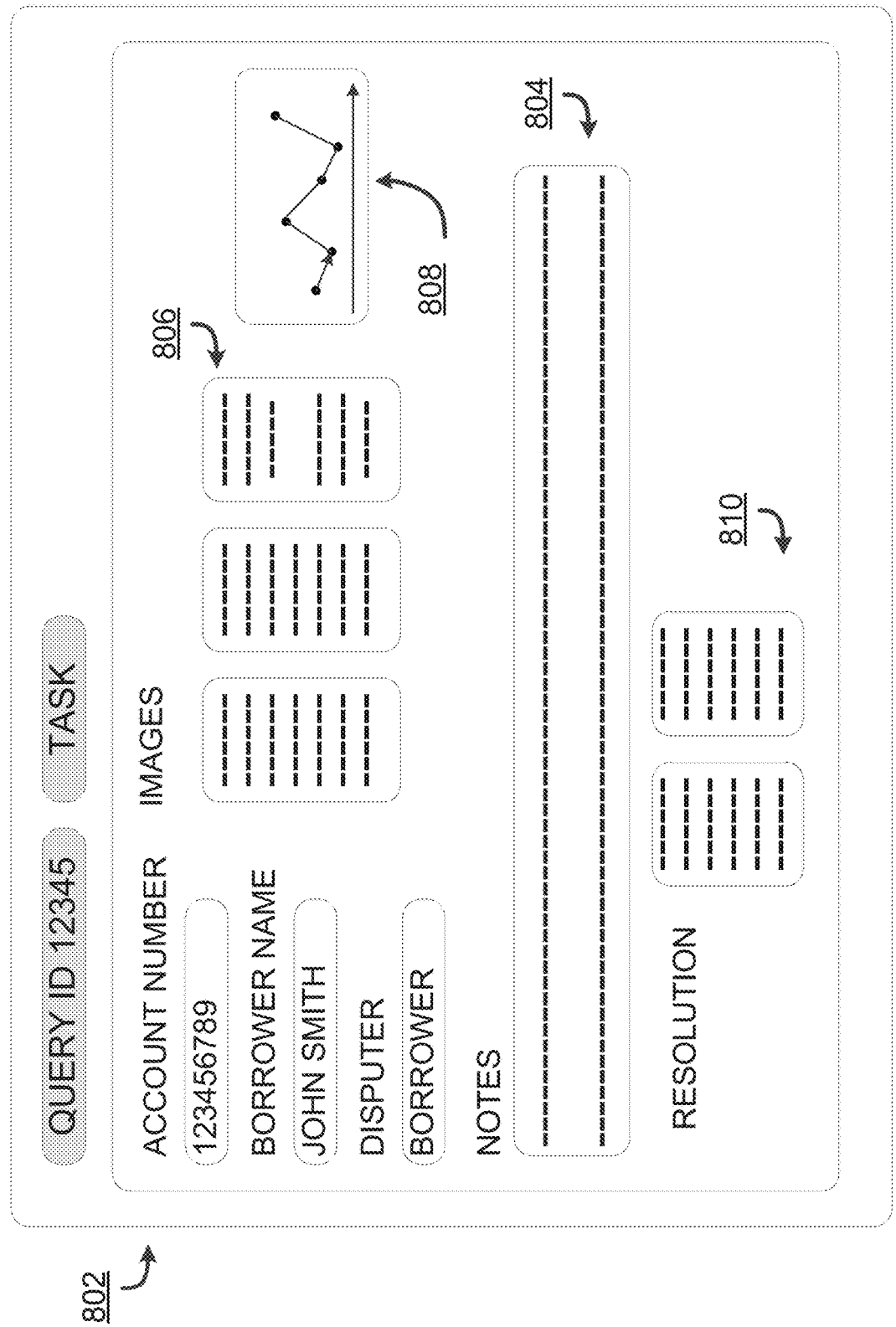
FIG. 8 illustrates an exemplary resolution generated through a resolution process, consistent with disclosed embodiments.

FIG. 8 illustrates an exemplary documentation 800 generated through a resolution process, consistent with disclosed embodiments. In some embodiments, while accomplishing the task through graphical user interfaces such as graphical user interfaces 600, 612, 614, 622, and 626, the resolution system may continually associate the graphical user interfaces, text-based and/or image-based inputs and outputs, retrieved information, a resolution, and a publication with the query. The query may be further associated with the query ID, the querying entity, and/or the identified task. For example, the resolution system may store in data storage (e.g., data storage 108) data describing and/or otherwise indicating the graphical user interfaces, text-based and/or image-based inputs and outputs, retrieved information, resolution, publication, query ID, querying entity, and/or identified task and associate the stored information with the query. The data and/or other information may include, for example, text-based data and/or image-based data.

Based on some or all of the associated information, the resolution system may generate documentation 800. In some embodiments, as shown in FIG. 8, documentation 800 may include an indication 802 of information associated with the query. The information may include, for example, information received with the query, information retrieved from another entity (e.g., data source(s) 108 or data storage 106), and/or information received as an input from an operator of the resolution system, as described above. The information indicated by indication 802 may describe, for example, the query, the querying entity, the inconsistent data, and/or other information.

Alternatively or additionally, in some embodiments documentation 800 may include an indication 804 of one or more text-based inputs received through the graphical user interfaces. For example, indication 804 may include an indication of text-based information provided by an operator through an input (e.g. text-based input 608 described above) in a graphical user interface. As another example, indication 804 may include an indication of text-based information retrieved from one or more entities, such as data source(s) 106 and/or data storage 108 described above. The text-based information may describe, for example, the inconsistent data, the task, and/or the resolution process.

Still alternatively or additionally, in some embodiments documentation 800 may include an indication 806 of one or more image-based inputs received through the graphical user interfaces. For example, indication 806 may include an indication of image-based information provided by an operator through an input (e.g. image-based input 810 described above) in a graphical user interface. As another example, indication 806 may include an indication of image-based information retrieved from one or more entities, such as data source(s) 106 and/or data storage 108 described above. As still another example, indication 806 may include an indication of the graphical user interfaces themselves and/or screenshots of the graphical user interfaces. The image-based information may describe, for example, the inconsistent data, the task, and/or the resolution process.

Still alternatively or additionally, in some embodiments documentation 800 may include an indication 808 of one or more outputs provided through the graphical user interfaces. For example, indication 808 may include an indication of a text-based and/or graphic representation (e.g., image, chart, graph, etc.) of some or all of the retrieved information. As another example, indication 808 may include an indication of the graphical user interfaces themselves and/or screenshots of the graphical user interfaces. The text-based and/or graphic representation may describe, for example, the inconsistent data, the task, and/or the resolution process.

Still alternatively or additionally, in some embodiments documentation 800 may include an indication 810 of the resolution and/or the publication associated with the query. For example, indication 810 may include an indication of a text-based and/or graphic representation of the resolution and/or the publication, such as an image of the publication, a description of the resolution, and/or text included in the publication. The text-based and/or graphic representation may describe, for example, the inconsistent data, the task, and/or the resolution process.

It will be understood that the graphical user interfaces, publications, and documentations described above, including their contents, are merely illustrative and are not meant to be limiting. That is, other graphical user interfaces, publications, and documentations, including their contents, are possible as well.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider and merchant have been referred to herein for ease of discussion, it is to be understood that consistent with disclosed embodiments other entities may provide such services in conjunction with or separate from a financial service provider and merchant.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A system comprising:
   a processor; and
   a data storage comprising instructions that, when executed by the processor, cause the system to perform operations comprising:
      receiving a plurality of queries requesting resolution of inconsistent data between a plurality of databases, each query comprising a query task;
      assigning each query of the plurality of queries to a queue of a plurality of queues based on the query task associated with the query;
      selecting a first query from the queue based on a priority associated with the first query;
      identifying a task for the first query;
      generating, based on the task, a graphical user interface configured to receive input from an operator, the input being associated with resolving the task;
      accomplishing the task associated with the first query; and
      generating a document comprising the first query and the input received from the operator.

2. The system of claim 1, further comprising generating a graphical user interface (GUI) to accomplish the task.

3. The system of claim 2, further comprising receiving an input through the GUI, wherein the input is associated with the task.

4. The system of claim 3, wherein the input comprises an image-based input through the GUI, and wherein the image-based input is associated with the first query.

5. The system of claim 4, wherein the image-based input is selected using a pop-up window on the GUI.

6. The system of claim 4, wherein the priority is based on the task.

7. The system of claim 2, further comprising providing an output through the GUI.

8. The system of claim 7, wherein the output provided is associated with the task.

9. The system of claim 8, wherein the output includes a text-based output.

10. The system of claim 8, wherein the output includes a graphic output.

11. The system of claim 2, wherein the GUI further comprises an indication of a query ID assigned to the first query.

12. The system of claim 1, wherein the priority is based on a date associated with the first query.

13. The system of claim 1, further comprising receiving the plurality of queries from multiple entities.

14. The system of claim 13, wherein receiving the plurality of queries comprises periodically receiving the plurality of queries through a batch process.

15. The system of claim 13, further comprising generating and publishing documentation to the multiple entities, wherein the documentation describes at least one of the inconsistent data or the task.

16. The system of claim 1, wherein the first query is randomly selected from a set of queries whose respective priorities are the same.

17. The system of claim 1, further comprising selecting a second query from the plurality of queries.

18. The system of claim 17, further comprising creating a first instance for the first query and a second instance for the second query, wherein the first instance includes information received in the first query and the second instance includes information received in the second query.

19. The system of claim 18, further comprising creating the first instance and the second instance in the same queue or in a different queue.

20. A non-transitory computer-readable medium storing instructions which, when executed, cause at least one processor to perform operations, the operations comprising:
   receiving a plurality of queries requesting resolution of inconsistent data between a plurality of databases, each query comprising a query task and each query being received from a remote entity;
   assigning each query of the plurality of queries to a queue of a plurality of queues based on the task associated with the query;
   selecting a first query from the queue based on a priority associated with the first query, the priority based on at least one of a date associated with the first query or a deadline for resolution associated with the first query;
   identifying a task for the first query;
   generating, based on the task, a graphical user interface configured to receive input from an operator, the input being associated with resolving the task;
   accomplishing the task associated with the first query via a graphical user interface; and
   generating a document comprising the first query and the input received from the operator.

* * * * *